United States Patent
Shimokawa et al.

(10) Patent No.: US 12,104,077 B2
(45) Date of Patent: Oct. 1, 2024

(54) CURABLE COATING AGENT COMPOSITION AND CURED COATING FILM

(71) Applicant: THREEBOND CO., LTD., Tokyo (JP)

(72) Inventors: Eiji Shimokawa, Tokyo (JP); Hisanori Imaoka, Tokyo (JP); Manabu Kirino, Tokyo (JP)

(73) Assignee: THREEBOND CO., LTD., Tokyo (JP)

( * ) Notice: Subject to any disclaimer, the term of this patent is extended or adjusted under 35 U.S.C. 154(b) by 609 days.

(21) Appl. No.: 17/436,005

(22) PCT Filed: Dec. 12, 2019

(86) PCT No.: PCT/JP2019/048752
§ 371 (c)(1),
(2) Date: Sep. 2, 2021

(87) PCT Pub. No.: WO2020/188918
PCT Pub. Date: Sep. 24, 2020

(65) Prior Publication Data
US 2022/0145124 A1    May 12, 2022

(30) Foreign Application Priority Data
Mar. 18, 2019 (JP) ................ 2019-049913

(51) Int. Cl.
| | | |
|---|---|---|
| C09D 183/04 | (2006.01) | |
| C08G 77/08 | (2006.01) | |
| C08G 77/18 | (2006.01) | |
| C08K 5/06 | (2006.01) | |
| C08K 5/544 | (2006.01) | |
| C09D 5/16 | (2006.01) | |
| C08G 77/04 | (2006.01) | |

(52) U.S. Cl.
CPC .......... *C09D 183/04* (2013.01); *C08G 77/08* (2013.01); *C08G 77/18* (2013.01); *C08K 5/06* (2013.01); *C08K 5/544* (2013.01); *C09D 5/1675* (2013.01); *C08G 77/045* (2013.01); *C09D 5/16* (2013.01)

(58) Field of Classification Search
CPC combination set(s) only.
See application file for complete search history.

(56) References Cited

U.S. PATENT DOCUMENTS

| | | | |
|---|---|---|---|
| 2009/0293768 A1* | 12/2009 | Atsuchi | C09D 7/63 524/188 |
| 2014/0350175 A1 | 11/2014 | Dinkar et al. | |
| 2017/0349783 A1 | 12/2017 | Kirino | |
| 2018/0282546 A1* | 10/2018 | Okamoto | C08L 33/04 |
| 2021/0062001 A1* | 3/2021 | Friedel | C09J 11/04 |

FOREIGN PATENT DOCUMENTS

| | | |
|---|---|---|
| AU | 2017257120 A1 | 10/2018 |
| CN | 104114598 A | 10/2014 |
| JP | H07-310052 A | 11/1995 |
| JP | 2004-285280 A | 10/2004 |
| JP | 2009-185169 A | 8/2009 |
| JP | 2010-209217 A | 9/2010 |
| JP | 2015-509988 A | 4/2015 |
| WO | 2013/090127 A1 | 6/2013 |
| WO | 2016/104445 A1 | 6/2016 |
| WO | 2017/057473 A1 | 4/2017 |
| WO | 2017/187874 A1 | 11/2017 |
| WO | 2019/022087 A1 | 1/2019 |

OTHER PUBLICATIONS

Product data sheet for Shin Etsu KBM-603 (no date).*
PCT, International Search Report for the corresponding patent application No. PCT/JP2019/048752, dated Feb. 10, 2020, with English translation.
PCT, Written Opinion of the International Searching Authority for the corresponding patent application No. PCT/JP2019/048752, dated Feb. 10, 2020 (English translation not available).
Office Action dated Aug. 15, 2023 for the corresponding Japanese Patent Application No. 2021-506163, with English translation.
Office Action dated Sep. 30, 2022 for the corresponding Chinese patent application No. 201980092471.0, with English translation.
EPO, Extended European Search Report for the corresponding patent application No. 19919717.9, dated Apr. 8, 2022.
Office Action dated Nov. 30, 2022 for the corresponding Singapore patent application No. 11202108248W.
Office Action dated Feb. 17, 2023 for the corresponding Indian patent application No. 202147040242.
Office Action dated Dec. 5, 2023 for the corresponding Japanese Patent Application No. 2021-506163, with English translation.
Office Action dated Dec. 15, 2023 for the corresponding Malaysian Patent Application No. PI2021004331.

* cited by examiner

*Primary Examiner* — Marc S Zimmer
(74) *Attorney, Agent, or Firm* — LUCAS & MERCANTI, LLP

(57) ABSTRACT

An object of the present invention is to provide a curable coating agent composition excellent in adhesion to a substrate such as a (meth)acrylic resin, appearance of a thick coating film, and friction resistance of a cured coating film. A curable coating agent composition including a silicone oligomer (A) having a hydrolyzable functional group, a condensation reaction catalyst (B), a silane compound (C), and an organic solvent (D), in which the component (C) contains at least one or more of a silane compound (c1) having a primary amino group and a hydrolyzable functional group and at least one or more of a silane compound (c2) having a secondary amino group and a hydrolyzable functional group.

7 Claims, No Drawings

CURABLE COATING AGENT COMPOSITION AND CURED COATING FILM

CROSS REFERENCE TO RELATED APPLICATION

This Application is a 371 of PCT/JP2019/048752 filed on Dec. 12, 2019 which, in turn, claimed the priority of Japanese Patent Application No. 2019-049913 filed on Mar. 18, 2019, both applications are incorporated herein by reference.

TECHNICAL FIELD

The present invention relates to a curable coating agent composition and a cured coating film.

BACKGROUND ART

Conventionally, an antifouling coating agent mainly composed of a fluororesin or an organopolysiloxane has been frequently used on a surface of an object installed outdoors for a long period of time, such as an automobile body, a train, an aircraft, an outer wall of a building, a window glass, a bridge beam, a road traffic sign, a traffic signal, a signboard, a vending machine, or a solar panel.

As the antifouling coating agent, for example, Cited Document 1 discloses a silicone-based coating composition containing a silicone prepolymer mainly composed of a hydrolyzate or a partial hydrolyzate of a silicon alkoxide having a predetermined weight average molecular weight range, and a curing catalyst thereof as essential components.

CITATION LIST

Patent Literatures

Patent Literature 1: JP 2004-285280 A

SUMMARY OF INVENTION

Technical Problem

However, the antifouling coating agent of Cited Document 1 cannot be sufficiently satisfied from the viewpoint of (1) poor adhesion to a substrate such as a (meth)acrylic resin, (2) generation of cracks when a cured coating film is thickened, and (3) poor friction resistance of the cured coating film.

The present invention has been made in view of the above circumstances, and an object thereof is to provide a curable coating agent composition excellent in adhesion to a substrate such as a (meth)acrylic resin, appearance of a thick coating film, and friction resistance of a cured coating film.

Solution to Problem

The gist of the present invention will be described below.
[1] A curable coating agent composition including a silicone oligomer (A) having a hydrolyzable functional group, a condensation reaction catalyst (B), a silane compound (C), and an organic solvent (D), in which the component (C) contains at least a silane compound (c1) having a primary amino group and a hydrolyzable functional group and a silane compound (c2) having a secondary amino group and a hydrolyzable functional group.
[2] The curable coating agent composition according to [1], containing 0.1 to 20 parts by mass of the component (c1) and 0.1 to 20 parts by mass of the component (c2) with respect to 100 parts by mass of the component (A).
[3] The curable coating agent composition according to [1] or [2], in which the component (A) contains a silicone oligomer (a1) having a hydrolyzable functional group having a viscosity of 91 to less than 300 mm$^2$/s at 25° C. and a silicone oligomer (a2) having a hydrolyzable functional group having a viscosity of 7 to less than 90 mm$^2$/s at 25° C.
[4] The curable coating agent composition according to any one of [1] to [3], in which the component (B) is at least one selected from the group consisting of phosphoric acid, an organoaluminum compound, an organotitanium compound, an organozirconium compound, an organozinc compound, an organotin compound, and an organocobalt compound.
[5] The curable coating agent composition according to any one of [1] to [4], in which the component (B) is at least one selected from the group consisting of an organoaluminum compound and an organotitanium compound.
[6] The curable coating agent composition according to any one of [1] to [5], in which the hydrolyzable functional group of the component (A) is an alkoxysilyl group.
[7] The curable coating agent composition according to any one of [1] to [6], forming a coating on a surface of any of metal, glass, ceramics, plastic, and fiber.
[8] A cured coating film obtained by curing the curable coating agent composition according to any one of [1] to [7].

Advantageous Effects of Invention

According to the present invention, it is possible to provide a curable coating agent composition excellent in adhesion to a substrate such as a (meth)acrylic resin, appearance of a thick coating film, and friction resistance of a cured coating film.

DESCRIPTION OF EMBODIMENTS

Details of the invention will be described below. In the present specification, "X to Y" is used for indicating that a numerical value (X and Y) before and after "X to Y" is included as the lower limit value and the upper limit value, and means "X or more and Y or less".

<Component (A)>

The component (A) contained in the curable coating agent composition of the present invention is a silicone oligomer having a hydrolyzable functional group, and is a component that exhibits improvement in adhesion to an adherend, appearance of a thick coating film, and friction resistance. Examples of the component (A) include a silicone oligomer that can be obtained by partially hydrolyzing and dealcoholization condensation an alkoxysilane compound with a known catalyst such as an acid, a base, an organotin compound, or an organotitanium compound. More specific examples thereof include silicone oligomers having a hydrolyzable functional group at an end, a side chain, or the like of the molecular chain, and having a linear or three-dimensional network structure. Among them, silicone oligomers having hydrolyzable functional groups at both the end of the molecular chain and the side chain of the molecular chain are particularly preferable because a curable coating agent composition having an appearance of a thick coating film and friction resistance can be obtained.

The hydrolyzable functional group of the component (A) is not particularly limited, and examples thereof include alkoxy groups such as a methoxy group, an ethoxy group, a propoxy group, and a butoxy group; acyloxy groups such as an acetoxy group, a propionyloxy group, a butylcarbonyloxy group, and a benzoyloxy group; alkenyloxy groups such as an isopropenyloxy group, an isobutenyloxy group, and a 1-ethyl-2-methylvinyloxy group; ketoxime groups such as a dimethylketoxime group, a methylethylketoxime group, a diethylketoxime group, a cyclopentanoxime group, and a cyclohexanoxime group; amino groups such as an N-methylamino group, an N-ethylamino group, an N-propylamino group, an N-butylamino group, an N,N-dimethylamino group, an N,N-diethylamino group, and an N-cyclohexylamino group; amide groups such as an N-methylacetamide group, an N-ethylacetamide group, and an N-methylbenzamide group; aminooxy groups such as an N,N-dimethylaminooxy group and an N,N-diethylaminooxy group; and the like, and among the hydrolyzable functional groups, an alkoxy group is preferable from the viewpoint of obtaining a coating agent excellent in adhesion to an adherend, appearance of a thick coating film, and friction resistance.

A kinematic viscosity of the component (A) at 25° C. is preferably in a range of 7 to 300 mm$^2$/s, more preferably in a range of 10 to 250 mm$^2$/s, and particularly preferably in a range of 20 to 150 mm$^2$/s. In particular, it is preferable that a silicone oligomer (a1) having a hydrolyzable functional group with a viscosity of 91 to 300 mm$^2$/s and a silicone oligomer (a2) having a hydrolyzable functional group with a viscosity of 7 to 90 mm$^2$/s are used in combination as the component (A). In the present invention, when the component (A) is set as described above, it is possible to obtain a coating agent excellent in adhesion to an adherend, appearance of a thick coating film, and durability. The viscosity can be measured in accordance with JIS K-2283: 2000.

When the component (A) contains an alkoxy group as a hydrolyzable functional group, an amount of the alkoxy group in a structure of the component (A) is preferably in a range of 12 to 40% by mass, more preferably in a range of 15 to 37% by mass, and particularly preferably in a range of 18 to 35% by mass. When the amount of the alkoxy group is set within the above range, it is possible to obtain a curable coating agent composition excellent in adhesion to a substrate such as a (meth)acrylic resin, appearance of a thick coating film, and friction resistance of a cured coating film. Note that the amount of alkoxy group can be measured by $^1$H-NMR and $^{29}$Si-NMR.

The commercially available product of the component (A) is not particularly limited, and examples thereof include X-40-9225, X-40-9227, X-40-9246, X-40-9250, KR-500, KC-89S, KR-401N, KR-510, KR-9216, KR-213 (products from Shin-Etsu Chemical Co., Ltd.), XC96-B0446, XR31-B1410, XR31-B2733, XR31-B2230, TSR165, XR31-B6667, XR31-B1763 (products from Momentive Performance Materials Inc.), SILRES (registered trademark) MSE100, SILRES H44, WACKER (registered trademark) SILICATE TES40 (products from Wacker Asahikasei Silicone Co., Ltd.), and the like, and these products may be used alone or in combination of two or more thereof.

<Component (B)>

The component (B) contained in the curable coating agent composition of the present invention is a condensation reaction catalyst, and is a compound for reacting a hydrolyzable functional group contained in the component (A) or the component (C) with moisture in the air and the like to cause a condensation reaction.

Examples of the component (B) include organoaluminum compounds such as acetylacetone aluminum and aluminum trisethylacetoacetate, organic tin compounds, organotitanium compounds such as tetrabutyl titanate, tetranonyl titanate, tetrakis ethylene glycol methyl ether titanate, tetrakis ethylene glycol ethyl ether titanate, and bis(acetylacetonyl)dipropyl titanate, organic metal-based catalysts such as organozirconium compounds, organozinc compounds, and organocobalt compounds, inorganic acid-based catalysts such as hydrochloric acid, sulfuric acid and phosphoric acid, organic acid catalysts such as p-toluenesulfonic acid, inorganic base catalysts such as sodium hydroxide, organic base catalysts such as tributylamine, 1,5-diazabicyclo [4.3.0] nonene-5 (DBN), and 1,8-diazabicyclo [5.4.0] undecene-7 (DBU), and the like. In the present invention, the component (B) is preferably phosphoric acid, an organoaluminum compound, an organotitanium compound, an organozirconium compound, an organozinc compound, an organotin compound, or an organocobalt compound, more preferably an organotin compound, an organotitanium compound, an organoaluminum-based compound, phosphoric acid, or p-toluenesulfonic acid, and particularly preferably an organotitanium compound or an organoaluminum-based compound from the viewpoint of the appearance of a thick coating film and the friction resistance of a cured coating film. These compounds may be used singly or in combination of two or more types thereof.

Examples of commercially available products of the organotitanium compound include Orgatix (registered trademark) TA-8, TA-21, TA-23, TA-30, TC-100, TC-401, and TC-710 (manufactured by Matsumoto Fine Chemical Co., Ltd.), D-20, D-25, and DX-175 (manufactured by Shin-Etsu Chemical Co., Ltd.), and the like. Examples of commercially available products of the organic aluminum-based compound include DX-9740, CAC-AC (manufactured by Shin-Etsu Chemical Co., Ltd.), and the like.

An amount of the component (B) added is not particularly limited, and for example, it is preferable to contain 0.01 to 50 parts by mass of the component (B) with respect to 100 parts by mass of the component (A), and it is more preferable to contain 0.03 to 40 parts by mass of the component (B). When the amount of the component (B) added is set within the above range, it is possible to obtain a curable coating agent composition excellent in adhesion to a substrate such as a (meth)acrylic resin, appearance of a thick coating film, and friction resistance of a cured coating film.

<Component (C)>

The component (C) contained in the curable coating agent composition of the present invention is a silane compound containing at least a silane compound (c1) having a primary amino group (group obtained by removing hydrogen from a primary amine: —NHR) and a hydrolyzable functional group and a silane compound (c2) having a secondary amino group (group obtained by removing hydrogen from a secondary amine: —NRR') and a hydrolyzable functional group, and the component (C) is combined with other components of the present invention to bring about a remarkable effect that a curable coating agent composition excellent in adhesion to a substrate such as a (meth)acrylic resin, appearance of a thick coating film, and friction resistance of a cured coating film is obtained. Note that when the component (C) of the present invention is a silane compound having a hydrolyzable functional group containing both a primary amino group and a secondary amino group, such as N-2-(aminoethyl)-3-aminopropyltrimethoxysilane or N-2-(aminoethyl)-3-aminopropylmethyldimethoxysilane, the said silane compound is handled as the component (c1). Further, in the present invention, a component containing one silicon atom in the structure is handled as the component (C), and a component in which a silane compound having a hydrolyzable functional group is partially subjected to condensation reaction is handled as the component (A) in the present invention.

The silane compound (c1) having a primary amino group and a hydrolyzable functional group is not particularly limited, and examples thereof include 3-aminopropyltrimethoxysilane, 3-aminopropyltriethoxysilane, N-2-(aminoethyl)-3-aminopropyltrimethoxysilane, N-2-(aminoethyl)-3-aminopropylmethyldimethoxysilane, 3-aminopropyldimethoxymethylsilane, 3-aminopropyldiethoxymethylsilane, and the like. The commercially available product of the component (c1) is not particularly limited, and examples thereof include KBM-903, KBE-903, KBM-603, KBM-602 (Shin-Etsu Chemical Co., Ltd.), A2628, D1980, T1255, A0439 (Tokyo Chemical Industry Co., Ltd.), and the like.

The silane compound (c2) having a secondary amino group and a hydrolyzable functional group is not particularly limited, and examples thereof include N-phenyl-3-aminopropyltrimethoxysilane, N-phenyl-3-aminopropyldimethoxymethylsilane, and the like. Among the components (c2), a silane compound having an aromatic ring structure is preferable because it is excellent in the appearance of a thick coating film and the friction resistance of a cured coating film. The commercially available product of the component (c2) is not particularly limited, and examples thereof include KBM-573 (Shin-Etsu Chemical Co., Ltd.) and the like.

An amount of the component (C) added is not particularly limited, and for example, it is preferable to contain 0.1 to 20 parts by mass of the component (c1) and 0.1 to 20 parts by mass of the component (c2) with respect to 100 parts by mass of the component (A), and it is more preferable to contain 0.5 to 10 parts by mass of the component (c1) and 0.5 to 10 parts by mass of the component (c2). When the amount of the component (C) added is set within the above range, it is possible to obtain a curable coating agent composition excellent in adhesion to a substrate such as a (meth)acrylic resin, appearance of a thick coating film, and friction resistance of a cured coating film.

<Component (D)>

The component (D) contained in the curable coating agent composition of the present invention is an organic solvent and is a component necessary for diluting and forming a coating film. From the viewpoint of workability in forming a coating layer by applying the curable coating agent composition of the present invention, the component (D) is preferably a compound having a high volatility to some extent, preferably having a boiling point of 190° C. or less, or in a case of a mixture, having an initial boiling point of 190° C. or less.

The component (D) is not particularly limited, and examples thereof include aromatic solvents such as benzene, toluene, and xylene; aliphatic hydrocarbon-based solvents such as n-hexane, n-heptane, isononane, isohexane, isooctane, cyclohexane, and methylcyclohexane; alcohol-based solvents having one or more carbon atoms, such as methanol, ethanol, 1-propanol, 2-propanol, 1-butanol, 2-butanol, and tert-butanol; ketone-based solvents such as acetone and methyl ethyl ketone; acetate-based solvents such as methyl acetate, ethyl acetate, propyl acetate, isopropyl acetate, and butyl acetate; halogen-based solvents such as dichloromethane, chloroform, tetrachloroethane, and chlorobenzene; ether-based solvents such as ethyl ether and THF; gasoline; naphthene-based petroleum-distilled solvents; paraffin-based petroleum-distilled solvents; isoparaffin-based petroleum-distilled solvents; and the like. These may be used alone, or several types thereof may be used in combination. In the present invention, from the viewpoint of obtaining a curable coating agent composition excellent in adhesion to an adherend such as a (meth)acrylic resin, appearance of a thick coating film, and friction resistance of a cured coating film, aromatic solvents, aliphatic hydrocarbon solvents, naphthene-based petroleum-distilled solvents, paraffin-based petroleum-distilled solvents, isoparaffin-based petroleum-distilled solvents, and the like are preferable.

The commercially available product corresponding to the component (D) is not particularly limited, and examples thereof include EXXSOL (registered trademark) D30 and D40 (manufactured by TonenGeneral Sekiyu K.K.), KYOWASOL (registered trademark) C-800, C-600M, and C-900 (manufactured by KH Neochem Co., Ltd.), Isopar (registered trademark) E (manufactured by Exxon Mobil Corporation), and the like.

An amount of the component (D) added in the present invention is in a range of 50 to 5000 parts by mass, preferably in a range of 100 to 4000 parts by mass, and more preferably in a range of 150 to 3500 parts by mass, with respect to 100 parts by mass of the component (A). When the amount of the component (D) added is set within the above range, it is possible to obtain a curable coating agent composition excellent in adhesion to a substrate such as a (meth)acrylic resin, appearance of a thick coating film, and friction resistance of a cured coating film.

<Optional Component>

Besides, the curable coating agent composition of the present invention can optionally contain an additive component(s) added thereto as appropriate, as long as the properties of the curable coating agent composition are not impaired. For example, it is possible to select components such as a silicone oil having a different structure from that of the component (A), an anti-aging agent, an antirust agent, a colorant, a surfactant, a rheology modifier, an ultraviolet absorber, a fluorescent agent, a polishing agent, a fragrance, and a filler.

<Method of Forming Cured Coating Film>

A method of forming a cured coating film of the curable coating agent composition of the present invention is not particularly limited, and, for example, fibers such as brush, sponge or waste cloth are impregnated with an appropriate amount of the curable coating agent composition of the present invention, and the composition is applied and spread over a substrate surface by hand. Then, a volatile component is vaporized by natural drying or drying using a dryer or the like. Consequently, a cured coating film of the curable coating agent composition can be formed.

The curable coating agent composition of the present invention is excellent in workability because no crack is generated even when the cured coating film after drying is thickened to about 50 μm, so that film thickness does not need to be strictly controlled during coating. A thickness of the cured coating film of the curable coating agent composition of the present invention is not particularly limited, and is in a range of 0.01 to 50 μm, preferably in a range of 0.1 to 40 μm. When the thickness of the coating film is within the above range, good water repellency and friction resistance can be maintained.

Examples of the substrate include metal, glass, ceramics, plastic, fiber, and the like, and among them, metal, glass, plastic, and the like are preferable. Specific examples of the metal include a steel plate and a coated steel plate. Examples of the plastic include (meth)acrylic resins, polycarbonate, polybutylene terephthalate, polyphenylene sulfide, polyethylene terephthalate, polyethylene naphthalate, acrylonitrile-butadiene-styrene resins, styrene-methacrylic resins, polystyrene, polyethylene, polypropylene, polyvinyl chloride, polyester, polyurethane, and the like. Among these, the curable coating agent composition of the present invention is preferable from the viewpoint that it is possible to form a cured coating film having excellent adhesion to a steel plate, a coated steelplate, a (meth)acrylic resin, polycarbonate, polybutylene terephthalate, polyethylene terephthalate, polyphenylene sulfide, polyethylene, polypropylene, a styrene-methacrylic resin, and the like. That is, according to another embodiment of the present invention, there is provided a method of producing a cured coating film, the method including forming a coating of a curable coating agent composition on a surface of any of metal, glass, ceramics, plastic, and fiber.

<Usage>

Examples of main usages of the curable coating agent composition of the present invention include antifouling coating agents for objects installed outdoors for a long period of time, such as automobile bodies, trains, aircrafts, roofs and outer walls of buildings, window glass, bridge beams, road traffic signs, traffic lights, signboards, vending machines, and solar panels; antifouling coating agents for equipment, component exteriors, and the like; and the like. That is, according to still another embodiment of the present invention, an antifouling coating agent composed of the curable coating composition is provided.

EXAMPLES

Hereinafter, the present invention will be described in details by taking Examples, but the present invention should not be limited to these Examples.

<Preparation of Curable Coating Agent Composition>

Example 1

Example 1 that was a curable coating agent composition was obtained by: adding 100 parts by mass of the silicone oligomer (a1) (X-40-9225 manufactured by Shin-Etsu Chemical Co., Ltd.) having a viscosity at 25° C. of 100 mm$^2$/s, having a alkoxy amount of 24% by mass, and containing methoxy groups at the side chain and the end of the molecular chain, and 4 parts by mass of the silicone oligomer (a2) (X-40-9250 manufactured by Shin-Etsu Chemical Co., Ltd.) having a viscosity at 25° C. of 80 mm$^2$/s, having a alkoxy amount of 25% by mass, and containing a methoxy group at the side chain and the end of the molecular chain as the component (A) of the present invention, 20 parts by mass of an organic aluminum-based catalyst (DX-9740 manufactured by Shin-Etsu Chemical Co., Ltd. (content of aluminum component being 9% by mass)) as the component (B), 2 parts by mass of 3-aminopropyltrimethoxysilane (c1) (KBM-903 manufactured by Shin-Etsu Chemical Co., Ltd.) and 2 parts by mass of N-phenyl-3-aminopropyltrimethoxysilane (c2) (KBM-573 manufactured by Shin-Etsu Chemical Co., Ltd.) as the component (C), and 250 parts by mass of an isononane-based solvent having a boiling point of 135° C. as the component (D), and mixing these components in an environment at 25° C. with a mixer for 60 minutes.

Example 2

Example 2 that was a curable coating agent composition was obtained in the same preparation method as in Example 1 except that 2 parts by mass of the component (c1) was changed to 1 part by mass and 2 parts by mass of the component (c2) was changed to 1 part by mass in Example 1.

Example 3

Example 3 that was a curable coating agent composition was obtained in the same preparation method as in Example 1 except that 4 parts by mass of the component (a2) was changed to 2 parts by mass in Example 1.

Example 4

Example 4 that was a curable coating agent composition was obtained in the same preparation method as in Example 1 except that the isononane-based solvent was changed to a naphthene-based solvent having a boiling point of 163° C. in Example 1.

Example 5

Example 5 that was a curable coating agent composition was obtained in the same preparation method as in Example 1 except that the organic aluminum-based catalyst was changed to tetraisopropyl titanate (TA-8 (content of titanium component 16.9% by mass) manufactured by Matsumoto Fine Chemical Co., Ltd.) in Example 1.

Comparative Example 1

Comparative Example 1 that was a curable coating agent composition was obtained in the same preparation method as in Example 1 except that the component (c1) and the component (c2) were removed in Example 1.

Comparative Example 2

Comparative Example 2 that was a curable coating agent composition was obtained in the same preparation method as in Example 1 except that the component (c1) was removed in Example 1.

Comparative Example 3

Comparative Example 3 that was a curable coating agent composition was obtained in the same preparation method as in Comparative Example 2 except that 2 parts by mass of the component (c2) was changed to 4 parts by mass in Comparative Example 2.

Comparative Example 4

Comparative Example 4 that was a curable coating agent composition was obtained in the same preparation method as in Example 1 except that the component (c2) was removed in Example 1.

Comparative Example 5

Comparative Example 5 that was a curable coating agent composition was obtained in the same preparation method as in Comparative Example 4 except that 2 parts by mass of the component (c1) was changed to 4 parts by mass in Comparative Example 4.

Comparative Example 6

Comparative Example 6 that was a curable coating agent composition was obtained in the same preparation method as in Example 1 except that tris-(trimethoxysilylpropyl)isocyanurate (manufactured by Shin-Etsu Chemical Co., Ltd.) was used instead of the component (c2) in Example 1.

Comparative Example 7

Comparative Example 7 that was a curable coating agent composition was obtained in the same preparation method as in Example 1 except that 3-methacryloxypropyltrimethoxysilane (manufactured by Shin-Etsu Chemical Co., Ltd.) was used instead of the component (c2) in Example 1.

Comparative Example 8

Comparative Example 8 that was a curable coating agent composition was obtained in the same preparation method as in Example 1 except that trifluoropropyltrimethoxysilane (manufactured by Shin-Etsu Chemical Co., Ltd.) was used instead of the component (c2) in Example 1.

Test methods used in Examples and Comparative Examples in Table 1 are as follows.

<Adhesion Test>

Each curable coating agent composition was applied to a (meth)acrylic resin plate (dimension: 25 mm×100 mm) with a brush. Thereafter, the resulting product was allowed to stand in an environment at 25° C. and 55% RH for 1 day and dried to obtain a cured coating film having a thickness of 15 μm. The cured coating film covered with 100-square incision was used as a test piece. A cellophane tape was peeled off to confirm a residual amount of a coating film. The details were in accordance with JIS-K-5600-5-6: 1999. A residual amount of 90 or more was rated "pass", and a residual amount of less than 90 was rated "fail".

<Thick Film Coating Test>

Each curable coating agent composition was poured into a polytetrafluoroethylene mold for molding having an inner dimension of 25 mm×80 mm×50 μm. Thereafter, the resulting product was allowed to stand in an environment at 25° C. and 55% RH for 1 day and dried to obtain a cured coating film having a thickness of 15 μm. Then, an appearance of the cured coating film was visually evaluated. A cured coating film having no crack was rated "pass", and a cured coating film having a crack was rated "fail".

<Friction Resistance Test (Whitening Check)>

Each curable coating agent composition was applied to a glass plate (dimension: 25 mm×100 mm) with a brush. Thereafter, the resulting product was allowed to stand in an environment at 25° C. and 55% RH for 1 day and dried to obtain a cured coating film having a thickness of 15 μm. Next, reciprocation with a waste cloth was performed 10 times while a load of 200 g was applied to the cured coating film. Thereafter, the appearance was visually confirmed and then evaluated. A cured coating film having a transparent surface was rated pass, and a cured coating film having a whitened surface was rated fail.

TABLE 1

| | | Component | Example 1 | Example 2 | Example 3 | Example 4 | Example 5 | Comparative Example 1 | Comparative Example 2 |
|---|---|---|---|---|---|---|---|---|---|
| (A) | (a1) | X-40-9225 | 100 | 100 | 100 | 100 | 100 | 100 | 100 |
| | (a2) | X-40-9250 | 4 | 4 | 2 | 4 | 4 | 4 | 4 |
| (B) | | DX-9740 | 20 | 20 | 20 | 20 | | 20 | 20 |
| | | TC-8 | | | | | 20 | | |
| (C) | (c1) | KBM-903 | 2 | 1 | 2 | 2 | 2 | | |
| | (c2) | KBM-573 | 2 | 1 | 2 | 2 | 2 | | 2 |
| | | KBM-603 | | | | | | | |
| Comparative | | KBM-9659 | | | | | | | |
| (C) | | KBM-503 | | | | | | | |
| | | KBM-7103 | | | | | | | |
| (D) | | KYOWASOL C-900 | 250 | 250 | 250 | | 250 | 250 | 250 |
| | | EXXSOL D30 | | | | 250 | | | |
| Adhesion test | | | Pass | Pass | Pass | Pass | Pass | Fail | Fail |
| Thick film/appearance test | | | Pass | Pass | Pass | Pass | Pass | Pass | Pass |
| Friction resistance test | | | Pass | Pass | Pass | Pass | Pass | Pass | Pass |
| Antifouling property test | | | Pass | Pass | Pass | Pass | Pass | Pass | Pass |

| | | Component | Comparative Example 3 | Comparative Example 4 | Comparative Example 5 | Comparative Example 6 | Comparative Example 7 | Comparative Example 8 |
|---|---|---|---|---|---|---|---|---|
| (A) | (a1) | X-40-9225 | 100 | 100 | 100 | 100 | 100 | 100 |
| | (a2) | X-40-9250 | 4 | 4 | 4 | 4 | 4 | 4 |
| (B) | | DX-9740 | 20 | 20 | 20 | 20 | 20 | 20 |
| | | TC-8 | | | | | | |
| (C) | (c1) | KBM-903 | | 2 | 4 | 2 | 2 | 2 |
| | (c2) | KBM-573 | 4 | | | | | |
| | | KBM-603 | | | | | | |
| Comparative | | KBM-9659 | | | | 2 | | |
| (C) | | KBM-503 | | | | | 2 | |
| | | KBM-7103 | | | | | | 2 |
| (D) | | KYOWASOL C-900 | 250 | 250 | 250 | 250 | 250 | 250 |
| | | EXXSOL D30 | | | | | | |
| Adhesion test | | | Fail | Fail | Fail | Fail | Fail | Fail |
| Thick film/appearance test | | | Pass | Pass | Fail | Pass | Pass | Pass |

TABLE 1-continued

| Friction resistance test | Fail | Pass | Pass | Pass | Pass | Pass |
| --- | --- | --- | --- | --- | --- | --- |
| Antifouling property test | Pass | Pass | Pass | Pass | Pass | Pass |

\* The units of the numerical values with respect to the components are "part by mass".

According to Examples 1 to 5 in Table 1, it can be seen that the present invention is a curable coating agent composition excellent in adhesion to a substrate with respect to plastic, such as a (meth)acrylic resin, and glass, appearance of a thick coating film, and friction resistance of a cured coating film.

According to Comparative Examples 1 to 8 in Table 1, it can be seen that when the combination of the component (C) of the present invention is not used, the adhesion to a substrate such as a (meth)acrylic resin is poor. In addition, according to Comparative Example 3, it can be seen that the friction resistance of a cured coating film is poor in the case of only the component (c2). In addition, according to Comparative Example 5, it can be seen that the appearance of a thick coating film is poor in the case of only the component (c1).

<Antifouling Confirmation Test>

Each of the curable coating agent compositions of Examples 1 to 5 was applied to a glass plate (dimension: 100 mm×100 mm) with a brush. Thereafter, the resulting product was allowed to stand in an environment at 25° C. and 55% RH for 1 day and dried to obtain a cured coating film having a thickness of 15 μm. Next, a line was drawn on the cured coating film of the glass plate with a black oily marker, and a degree of repellency was confirmed. A sample that repelled well was rated "pass", and a sample that did not repel was rated "fail". The cured coating films of the curable coating agent compositions of Examples 1 to 5 were all rated pass.

This application is based on Japanese Patent Application No. 2019-049913 filed on Mar. 18, 2019, the contents of which are entirely incorporated herein by reference.

INDUSTRIAL APPLICABILITY

The curable coating agent composition of the present invention is excellent in adhesion to a substrate such as plastic such as a (meth)acrylic resin, appearance of a thick coating film, and friction resistance of a cured coating film, thus can be used as various antifouling coating agents, and is industrially useful.

The invention claimed is:

1. A curable coating agent composition comprising: a silicone oligomer (A) having a hydrolyzable functional group; a condensation reaction catalyst (B); a silane compound (C); and an organic solvent (D), wherein the component (C) contains at least one or more of a silane compound (c1) having a primary amino group and a hydrolyzable functional group and at least one or more of a silane compound (c2) having a secondary amino group and a hydrolyzable functional group, and the component (A) contains a silicone oligomer (a1) having a hydrolyzable functional group having a viscosity of 91 to 300 mm$^2$/s at 25° C. and a silicone oligomer (a2) having a hydrolyzable functional group having a viscosity of 7 to 90 mm$^2$/s at 25° C.

2. The curable coating agent composition according to claim 1, containing 0.1 to 20 parts by mass of the component (c1) and 0.1 to 20 parts by mass of the component (c2) with respect to 100 parts by mass of the component (A).

3. The curable coating agent composition according to claim 1, wherein the component (B) is at least one selected from the group consisting of phosphoric acid, an organoaluminum compound, an organotitanium compound, an organozirconium compound, an organozinc compound, an organotin compound, and an organocobalt compound.

4. The curable coating agent composition according to claim 1, wherein the component (B) is at least one selected from the group consisting of an organoaluminum compound and an organotitanium compound.

5. The curable coating agent composition according to claim 1, wherein the hydrolyzable functional group of the component (A) is an alkoxysilyl group.

6. The curable coating agent composition according to claim 1, forming a coating on a surface of any of metal, glass, ceramics, plastic, and fiber.

7. A cured coating film obtained by curing the curable coating agent composition according to claim 1.

\* \* \* \* \*